(12) United States Patent
Liu et al.

(10) Patent No.: US 9,471,829 B2
(45) Date of Patent: Oct. 18, 2016

(54) METHOD OF FACIAL LANDMARK DETECTION

(75) Inventors: Ang Liu, Beijing (CN); Yangzhou Du, Beijing (CN); Tao Wang, Beijing (CN); Jianguo Li, Beijing (CN); Qiang Li, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,296

(22) PCT Filed: Mar. 31, 2011

(86) PCT No.: PCT/CN2011/000553
§ 371 (c)(1),
(2), (4) Date: Nov. 4, 2013

(87) PCT Pub. No.: WO2012/129727
PCT Pub. Date: Oct. 4, 2012

(65) Prior Publication Data
US 2014/0050358 A1    Feb. 20, 2014

(51) Int. Cl.
*G06K 9/00* (2006.01)
*G06K 9/46* (2006.01)
*G06K 9/62* (2006.01)

(52) U.S. Cl.
CPC ....... *G06K 9/00248* (2013.01); *G06K 9/00281* (2013.01); *G06K 9/6209* (2013.01)

(58) Field of Classification Search
CPC ............... G06K 9/00281; G06K 9/00248; G06K 9/6209; A61B 2019/5265; G06T 2207/30201
See application file for complete search history.

(56) References Cited

U.S. PATENT DOCUMENTS

2003/0206171 A1* 11/2003 Kim et al. ............... 345/473
2006/0133672 A1   6/2006 Li
2007/0154096 A1*  7/2007 Cao et al. ............... 382/190

(Continued)

FOREIGN PATENT DOCUMENTS

CN    1731416    *  2/2006   ............... G06K 9/00
CN    1731416 A     2/2006

(Continued)

OTHER PUBLICATIONS

Pau et al ("Rapid Object Detection using a Boosted Cascade of Simple Features", IEEE 2001).*

(Continued)

*Primary Examiner* — Amara Abdi
(74) *Attorney, Agent, or Firm* — Jordan IP Law, LLC

(57) ABSTRACT

Detecting facial landmarks in a face detected in an image may be performed by first cropping a face rectangle region of the detected face in the image and generating an integral image based at least in part on the face rectangle region. Next, a cascade classifier may be executed for each facial landmark of the face rectangle region to produce one response image for each facial landmark based at least in part on the integral image. A plurality of Active Shape Model (ASM) initializations may be set up. ASM searching may be performed for each of the ASM initializations based at least in part on the response images, each ASM search resulting in a search result having a cost. Finally, a search result of the ASM searches having a lowest cost function may be selected, the selected search result indicating locations of the facial landmarks in the image.

19 Claims, 18 Drawing Sheets

(56) References Cited

U.S. PATENT DOCUMENTS

| 2008/0063263 | A1* | 3/2008 | Zhang et al. | 382/159 |
| 2008/0205721 | A1* | 8/2008 | Udupa et al. | 382/128 |
| 2008/0253664 | A1* | 10/2008 | Li et al. | 382/226 |
| 2008/0310759 | A1 | 12/2008 | Liu et al. | |

FOREIGN PATENT DOCUMENTS

| CN | 1776711 | A | | 5/2006 | |
| CN | 101216882 | | * | 7/2008 | G06K 9/00 |
| CN | 101216882 | A | | 7/2008 | |
| CN | 101593272 | A | | 12/2009 | |
| WO | 2012/129727 | A1 | | 10/2012 | |

OTHER PUBLICATIONS

International Search Report and Written Opinion received for International Application No. PCT/CN2011/000553, mailed on Jan. 5, 2012, 12 pages.
Caunce et al., "Improved 3D Model Search for Facial Feature Location and Pose Estimation in 2D images", Imaging Science & Biomedical Engineering, The University of Manchester, Published in 2010, pp. 1-10.
Cootes et al., "Statistical Models of Appearance for Computer Vision 1", Imaging Science and Biomedical Engineering, University of Manchester, Published on Mar. 8, 2004, pp. 1-125.
Liang et al., "Face Alignment via Component-based Discriminative Search", Microsoft Research Asia, Beijing, Published on Apr. 8, 2010, pp. 1-14.
Freund et al., "A Decision-theoretic generalization of on-line learning and an application to boosting", AT & T Bell Laboratories, Published on Sep. 20, 1995, pp. 1-34.
Hamsici et al., "Active Appearance Models with Rotation Invariant Kernels", Department of Electrical and Computer Engineering, Ohio State University, published in 2009, pp. 1-7.
Sattar et al., "Face Alignment by 2.5D Active Appearance Model Optimized by Simplex", Team SCEE, SUPELEC/IETR, published in 2007, pp. 1-10.
Papageorgiou et al., "A General Framework for Object Detection", Center for Biological and Computational Learning Artificial Intelligence Laboratory, MIT, Cambridge, published in 1998, pp. 555-562.
Su et al., "Texture Representation in AAM using Gabor Wavelet and Local Binary Patterns", Proceedings of the 2009 IEEE International Conference on Systems, Man, and Cybernetics, Published in Oct. 2009, pp. 1-6.\
Viola et al., "Rapid Object Detection using a Boosted Cascade of Simple Features", Accepted Conference on Computer Vision and Pattern Recognition, 2001, pp. 1-9.
Wu et al., "Face Alignment via Boosted Ranking Model", CVPR, IEEE Computer Society, publised in 2008, pp. 1-8.
Zhang et al. "Robust Face Alignment Based on Hierarchical Classifier Network", Department of Computer Science, Tsinghua University, 2006, pp. 1-11.
Kumar et al, "Face Tracer Database", CAVE | Databases, retreived from 'http://www.cs.columbia.edu/CAVE/databases/facetracer/', Fall 2008, pp. 1-2.
Oki, "FSE (Face Sensing Engine)", Ver. 4 represents the base for a number of solutiopns to increase the utility value of built-in camera, launched in 2005, pp. 1-2.
Jake, "GENKI-4K Face, Expression, and Pose Dataset", The MPLab GENKI Database, Machine Perception Laboratory, published in Jun. 16, 2008.
Extended European Search Report for European Application No. 11862556.5 , mailed on Mar. 30, 2015, 5 pages.

* cited by examiner

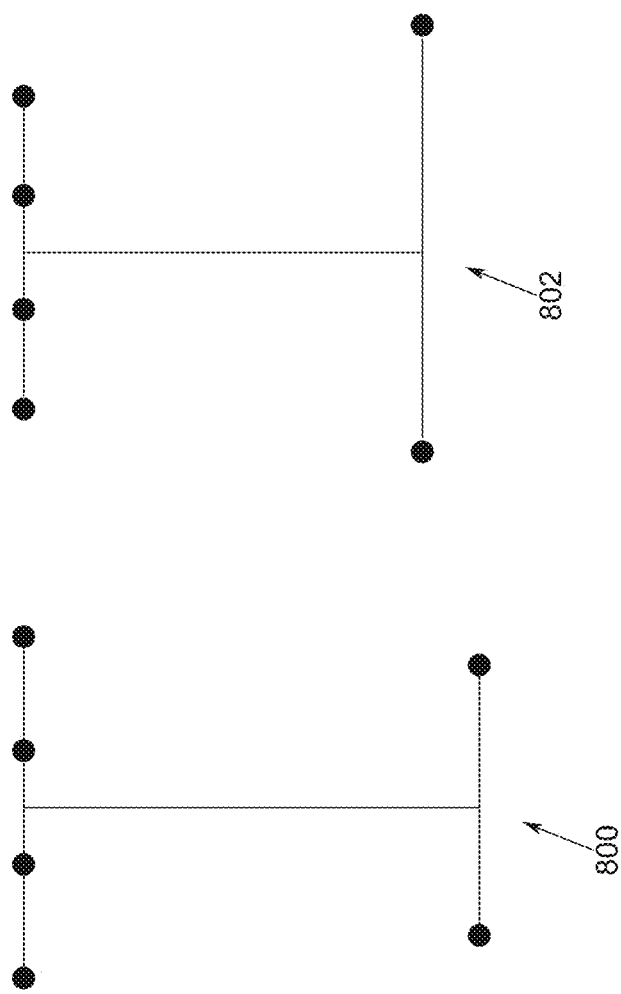

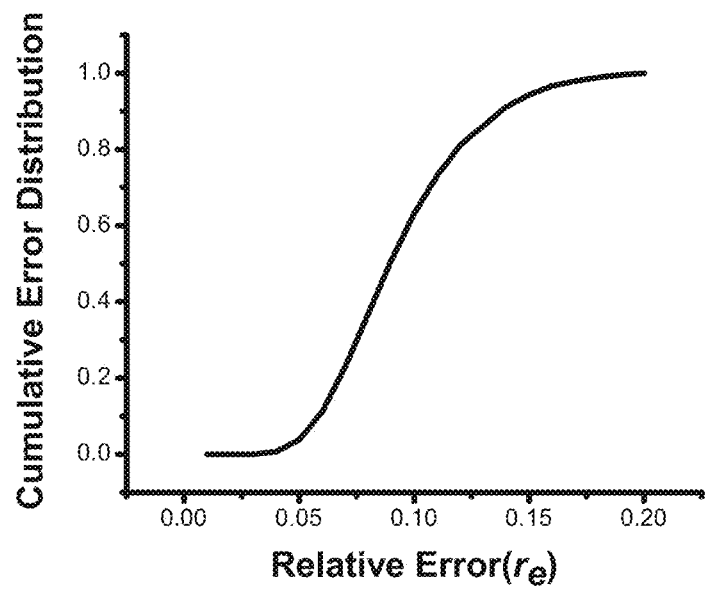
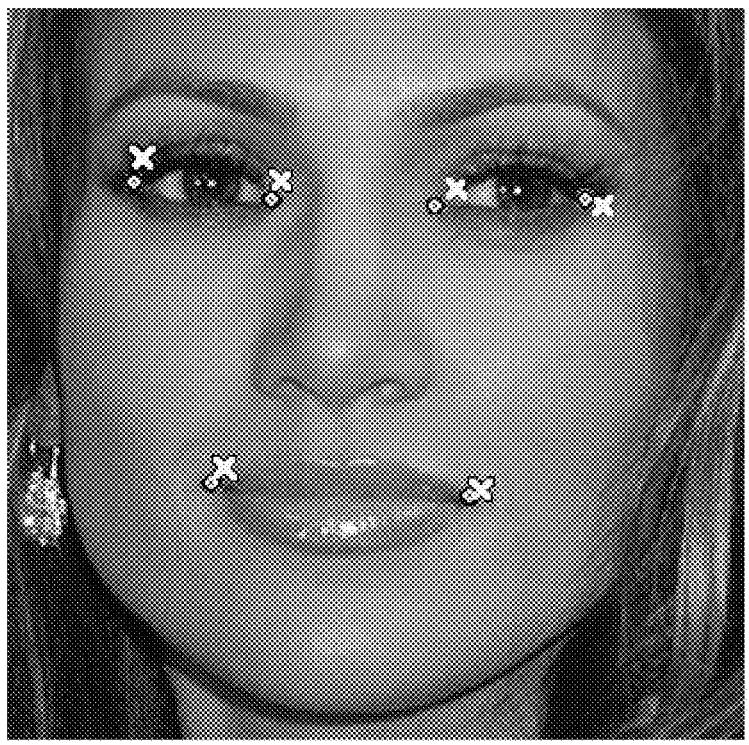
Figure 11

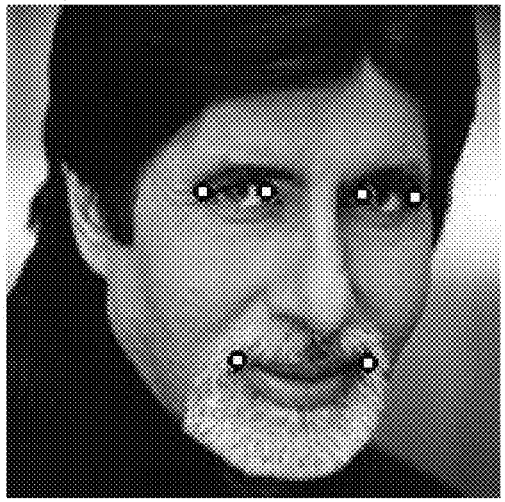
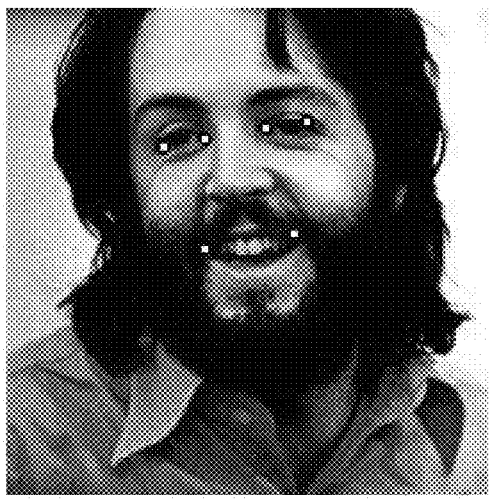
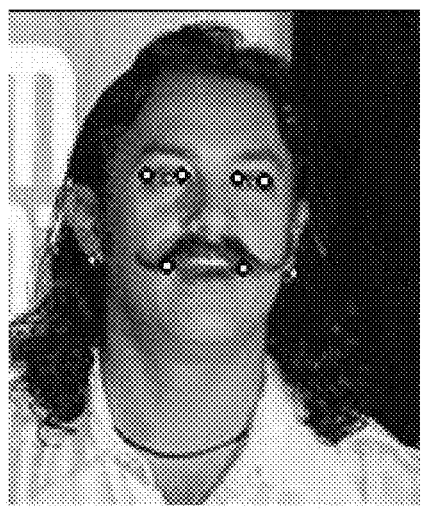
Figure 12

METHOD OF FACIAL LANDMARK DETECTION

FIELD

The present disclosure generally relates to the field of image processing. More particularly, an embodiment of the invention relates to facial landmark detection processing executed by a processor in a processing system for analyzing facial images.

BACKGROUND

With the advancement of increased computing power in embedded computing devices, face recognition applications are becoming more and more popular, e.g., Auto focus/Auto white balance/Auto exposure (3A) processing and smile shutter in digital cameras, avatar-based communications on smart phones, and face recognition login capabilities on handheld computing devices. In these facial analysis applications, facial landmark detection is an important processing step since the accuracy of the output results of a facial landmark detection module greatly affects the performance of succeeding facial image processing steps. In addition, facial landmark detection is one of the most time consuming modules in a face recognition processing pipeline. Therefore, fast facial landmark detection processing may be important for facial analysis applications, especially for embedded platforms with limited computing power (such as smart phones and mobile Internet devices (MIDs).

Recently, research into facial landmark detection techniques has increased. The main landmark points on a human face include eye corners, mouth corners, and nose tip. The detection task is to identify the accurate position of these points after the approximate region of a face is found. This is usually a nontrivial task, since there are significant variations of the appearance of facial features due to different head poses, facial expressions, uneven lightings, accessories, and potential occlusions. A good facial landmark detection process should be able to deal with all of these variations.

There are at least several known approaches, where the Active Shape Model (ASM) and the Active Appearance Model (AAM) are the most classical methods. These models are shown in "Statistical Models of Appearance for Computer Vision," by T. F. Cootes and C. J. Taylor, University of Manchester, Mar. 8, 2004. The ASM/AAM use statistical methods to capture example variances in training sets and to optimize a cost function to fit a shape model to new examples. In recent years, improvements have been proposed within the ASM/AAM framework, such as utilizing advanced image features, or hierarchical coarse-to-fine searches. These methods improve the accuracy of landmark detection, but on the other hand, the computational cost grows significantly and it cannot reach real-time performance on modern embedded computing platforms. For example, one method as disclosed in "Robust Face Alignment Based on Hierarchical Classifier Network," by Li Zhang, Haizhou Ai, and Shihong Lao, Proceedings of the European Conference on Computer Vision (ECCV) Workshop Human Computer Interface (HCI) 2006, pp. 1-11, is too slow for near real-time usage by known processing systems. Accordingly, better and more efficient methods of facial landmark detection processing are desired.

BRIEF DESCRIPTION OF THE DRAWINGS

The detailed description is provided with reference to the accompanying figures. The use of the same reference numbers in different figures indicates similar or identical items.

FIG. 8 is a diagram of impractical face shapes according to an embodiment of the present invention.

FIG. 11 is a diagram of an error distribution of facial landmark detection results according to an embodiment of the present invention.

FIGS. 12-14 is an example set of detection results of facial landmarks according to an embodiment of the present invention.

DETAILED DESCRIPTION

Figure 1:
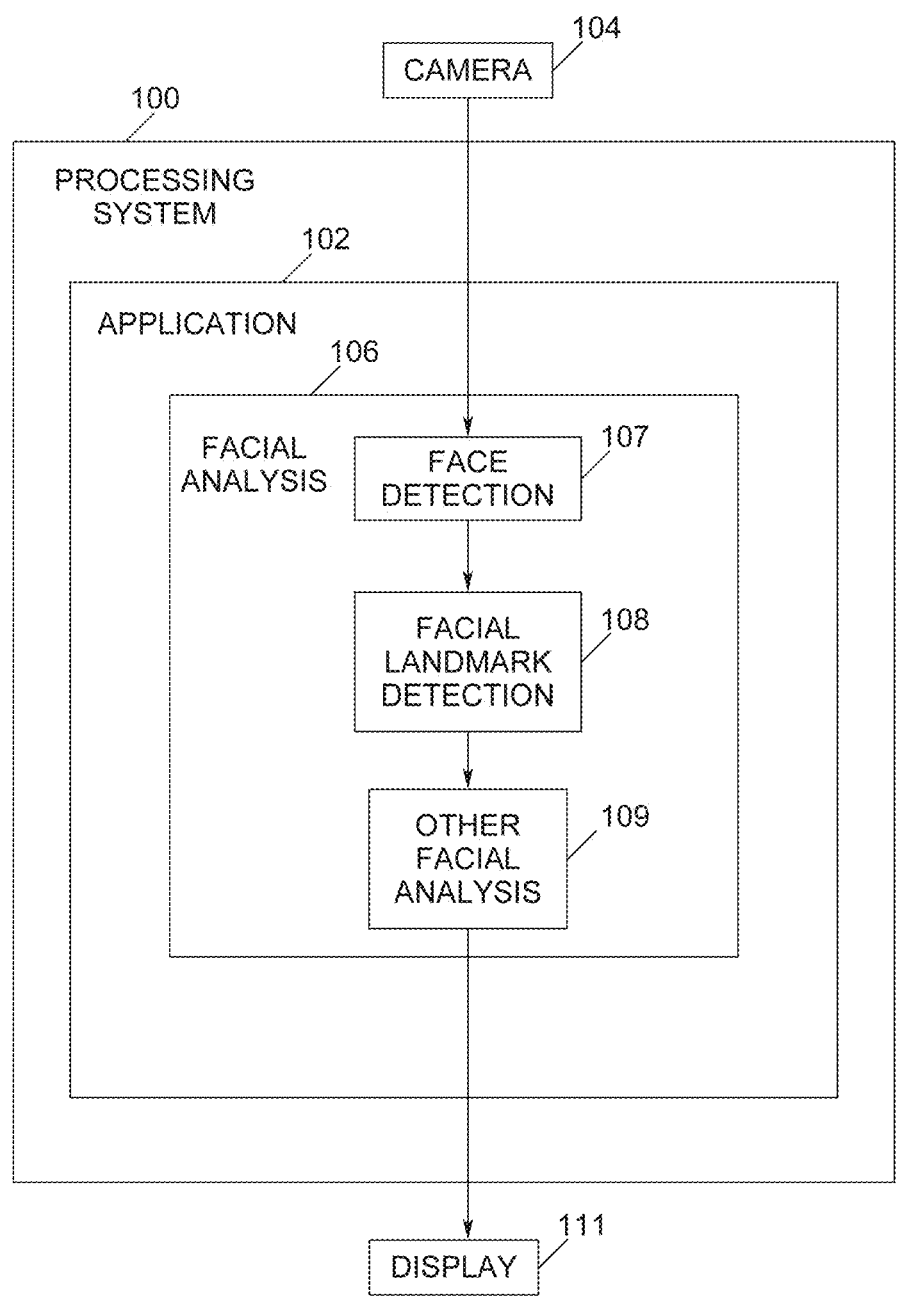
FIG. 1 is a diagram of a facial landmark detection component as part of a facial image processing system according to an embodiment of the present invention.

Embodiments of the present invention provide a fast and effective method for facial landmark detection. In an embodiment, Haar cascade classifiers may be put into an Active Shape Model (ASM) framework. The cascade classifier may be successfully used in face detection and the Haar-like feature can be accelerated by an integral image, which makes the facial landmark detection accurate and fast. The ASM framework ensures the shape fitting is within a valid shape space. To prevent the ASM search from falling into a local minimum, multiple configurations may be used to initialize shape parameters. To save computations, embodiments of the present invention only detect six landmark points (inner/outer corner of both eyes, left/right corner of mouth). These six points are generally sufficient for face alignment and many other face related tasks. Embodiments of the present invention perform facial landmark detection processing approximately five times faster than known prior art methods.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Further, various aspects of embodiments of the invention may be performed using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean either hardware, software (including for example micro-code that controls the operations of a processor), firmware, or some combination thereof.

Haar-like features are digital image features used in object recognition processing. They owe their name to their intuitive similarity with Haar wavelets and were used in the first real-time face detector. Historically, working with only image intensities (i.e., the RGB pixel values at each and every pixel of image) made the task of feature calculation computationally expensive. In "A General Framework for Object Detection," by Constantine Papageorgiou, Michael Oren and Tomaso Poggio, International Conference on Computer Vision, 1998, Papageorgiou, et al., discussed working with an alternate feature set based on Haar wavelets instead of the usual image intensities. As disclosed in "Rapid Object Detection Using a Boosted Cascade of Simple Features," by Paul Viola and Michael Jones, Conference on Computer Vision and Pattern Recognition, 2001, Viola and Jones adapted the idea of using Haar wavelets and developed the so called Haar-like features. A Haar-like feature considers adjacent rectangular regions at a specific location in a detection window, sums up the pixel intensities in these regions and calculates the difference between them. This difference is then used to categorize subsections of an image. For example, consider an image database with human faces. It is a common observation that among all faces the region of the eyes is darker than the region of the cheeks. Therefore a common Haar feature for face detection is a set of two adjacent rectangles that lie above the eye and the cheek region. The position of these rectangles is defined relative to a detection window that acts like a bounding box to the target object (the face in this case).

In the detection phase of the Viola-Jones object detection framework, a window of the target size is moved over the input image, and for each subsection of the image the Haar-like feature is calculated. This difference is then compared to a learned threshold that separates non-objects from objects. Because such a Haar-like feature is only a weak learner or classifier (its detection quality is slightly better than random guessing) a large number of Haar-like features is necessary to describe an object with sufficient accuracy. In the Viola-Jones object detection framework, the Haar-like features are therefore organized in something called a classifier cascade to form a strong learner or classifier. One advantage of a Haar-like feature over most other features is its calculation speed. Due to the use of integral images, a Haar-like feature of any size may be calculated in constant time (in one case, approximately 60 microprocessor instructions for a 2-rectangle feature).

Embodiments of the present invention process face images captured from a camera. FIG. 1 is a diagram of a processing system 100 in accordance with some embodiments of the invention. Processing system includes application 102, camera 104, and display 111. In various embodiments, the processing system may be a personal computer (PC), a laptop computer, a netbook, a tablet computer, a handheld computer, a smart phone, a mobile Internet device (MID), or any other stationary or mobile processing device. In some embodiments, the camera may be integral with the processing system. In other embodiments, the camera may be external to the processing system but communicatively coupled with the processing system. In an embodiment, images captured by a camera may be communicated over a network, or wired or wireless interface, to the processing system for analysis. Application 102 may be an application program to be executed on the processing system. In various embodiments, the application program may be a standalone program, or a part of another program (such as a plug-in, for example), for a web browser, image processing application, game, or multimedia application, for example. Application 102 may include facial analysis component 106 to analyze images captured by the camera to detect human faces. In an embodiment, facial analysis component 106 may comprise face detection component 107 to detect human faces in the images, facial landmark detection component 108 to detect facial landmarks in the detected faces, and other facial analysis component 109. In various embodiments, other facial analysis component 109 comprises components to perform one or more of face alignment, gender recognition, smile recognition, and/or face recognition processing. In an embodiment, the application 102, facial analysis component 106, the face detection component 107, the facial landmark detection component 108, and/or the other facial analysis component 109 may be implemented as a hardware component, firmware component, software component or combination of one or more of hardware, firmware, and/or software components, as part of processing system 100.

In an embodiment, a user may operate processing system 100 to capture one or more images from camera 104. The captured one or more images may be input to application 102 for various purposes. Application may pass the one or more images to facial analysis component 106 for determining facial characteristics in the one or more images. Facial analysis component 106 may use facial landmark detection component 108 to detect facial landmarks in the one or more images. Results of application processing, including facial analysis, may be shown on display 111.

Face detection processing may be performed on an input image from the camera to detect a face in the image. Any known face detection process may be used as long as the process produces a rectangle image of the detected face. The input data comprises one or more 2D images. In an embodiment, the 2D images comprise a sequence of video frames at a certain frame rate fps with each video frame having an image resolution (W×H). Most existing face detection approaches follow the well known Viola-Jones framework as shown in "Rapid Object Detection Using a Boosted Cascade of Simple Features," by Paul Viola and Michael Jones, Conference on Computer Vision and Pattern Recognition, 2001. However, based on experiments performed by the applicants, in an embodiment, use of Gabor features and a Cascade model in conjunction with the Viola-Jones framework may achieve relatively high accuracy for face detection. To improve the processing speed, in embodiments of the present invention, face detection may be decomposed into multiple consecutive frames. The number of faces #f, position in a frame (x, y), and size of faces in width and height (w, h) may be predicted for every video frame. Face detection processing 107 produces one or more face data sets (#f, [x, y, w, h]).

Some known face detection algorithms implement the face detection task as a binary pattern classification task. That is, the content of a given part of an image is transformed into features, after which a classifier trained on example faces decides whether that particular region of the image is a face, or not. Often, a window-sliding technique is employed. That is, the classifier is used to classify the (usually square or rectangular) portions of an image, at all locations and scales, as either faces or non-faces (background pattern).

A face model can contain the appearance, shape, and motion of faces. The Viola-Jones object detection framework is an object detection framework that provides competitive object detection rates in real-time. It was motivated primarily by the problem of face detection.

Components of the object detection framework include feature types and evaluation, a learning algorithm, and a cascade architecture. In the feature types and evaluation component, the features employed by the object detection framework universally involve the sums of image pixels within rectangular areas. With the use of an image representation called the integral image, rectangular features can be evaluated in constant time, which gives them a considerable speed advantage over their more sophisticated relatives.

In embodiments of the present invention, a new shape model may be used to describe the position of six facial landmark points (e.g., left eye corners, right eye corners, and mouth corners). In traditional ASM, the shape variation modes are derived through statistical analysis on a sample dataset, but the shape model of embodiments of the present invention may be artificially defined by a priori knowledge. This makes the shape model description more compact and each variation mode semantic. In spite of using only a few shape parameters, the shape model of embodiments of the present invention manages to fit a wide range of face variations. To prevent the ASM search from falling into a local minimum, a novel and effective method to perform multiple initializations may be used. The initialization is based on the probabilistic response from a Haar cascade classifier. The search result with the minimal value of the cost function is taken as the final output. This strategy greatly improves the accuracy of facial landmark detection processing.

In the cascade architecture component, the evaluation of the strong classifiers generated by the learning process can be done quickly, but it isn't fast enough to run in real-time. For this reason, the strong classifiers are arranged in a cascade in order of complexity, where each successive classifier is trained only on those selected samples which pass through the preceding classifiers. If at any stage in the cascade a classifier rejects the sub-window under inspection, no further processing is performed and cascade architecture component continues searching the next sub-window.

After locating the face regions during face detection processing 107, embodiments of the present invention detect accurate positions of facial features, such as the mouth, and corners of the eyes. A landmark is a point of interest within a face. The left eye, right eye, and nose base are all examples of landmarks. The landmark detection process affects the overall system performance for face related applications, since its accuracy significantly affects the performance of successive processing, e.g., face alignment, face recognition, and avatar animation. Two classical methods for facial landmark detection processing are the Active Shape Model (ASM) and the Active Appearance Model (AAM). The ASM and AAM use statistical models trained from labeled data to capture the variance of shape and texture. The ASM is disclosed in "Statistical Models of Appearance for Computer Vision," by T. F. Cootes and C. F. Taylor, Imaging Science and Biomedical Engineering, University of Manchester, Mar. 8, 2004.

In an embodiment, facial landmark detection processing 108 employs robust boosted classifiers to capture various changes of local texture. In addition, to prevent the optimal shape search from falling into a local minimum, multiple configurations may be used to initialize shape parameters.

In an embodiment, the cascade classifier may be run at a region of interest in the face image to generate possibility response images for each facial landmark. The probability output of the cascade classifier at location (x, y) is approximated as:

$$P(x, y) = 1 - \prod_{i=1}^{k(x,y)} f_i,$$

where $f_i$ is the false positive rate of the i-th stage classifier specified during a training process (a typical value of $f_i$ is 0.5), and k(x, y) indicates how many stage classifiers were successfully passed at the current location. It can be seen that the larger the score is, the higher the probability that the current pixel belongs to the target facial landmark.

Figure 2:
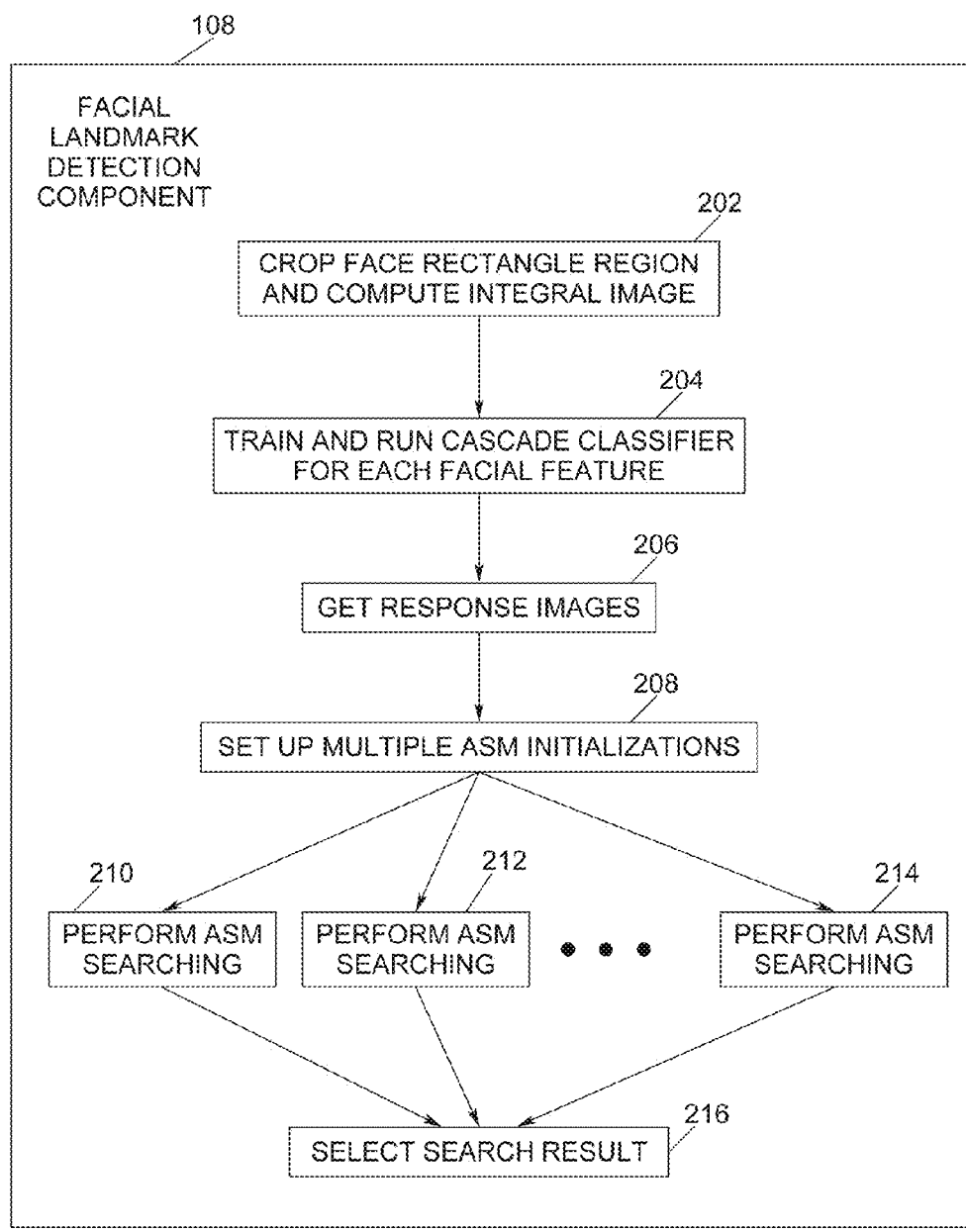
FIG. 2 is a flow diagram of facial landmark detection processing according to an embodiment of the present invention.

FIG. 2 is a flow diagram of facial landmark detection processing according to an embodiment of the present invention. If a face is detected in an input image, then at block 202, a face rectangle region of the image may be cropped and an integral image may be computed. An integral image is also known as a summed area table, which is used for quick calculation of Haar-like features.

At block 204, for each facial feature in the image, an individual cascade classifier may be trained, and each cascade classifier executed to output a probabilistic score for the current potential facial landmark. In this way, at block 206 at least one response image for each potential facial landmark of the image may be obtained which represents the likelihood of a facial landmark at a location in the cropped image.

However, the output of the cascade classifiers may not be accurate enough, and sometimes may return multiple responses. Geometry constraints between different landmarks also need to be considered. The geometry relationships may be learned in ASM training, and the probabilistic response image for each potential facial landmark may be used to calculate the cost of each potential landmark point during ASM searching. To prevent a local minimum from being chosen, multiple ASM initializations may be set up at block 208.

An ASM search may be performed for each ASM initialization at blocks 210, 212, . . . 214, with each ASM search outputting a search result. A search result comprises six pairs of coordinates representing points in the image where the six facial features may be located. At block 216, a search result may be selected. In an embodiment, the search result output from blocks 210, 212, . . . 214 with the lowest cost function may be selected as the output data for the facial landmark detection component 108. This output data represents the most likely locations of the six landmark points (($x_1$, $y_1$), ($x_2$, $y_2$), ($x_3$, $y_3$), ($x_4$, $y_4$), ($x_5$, $y_5$), ($x_6$, $y_6$)) in the image.

Figure 3:
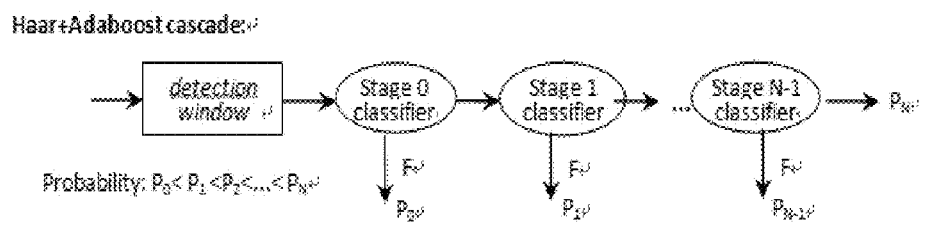
FIG. 3 is a diagram of a cascade of classifiers for object detection according to an embodiment of the present invention.

In an embodiment, the cascade classifiers and the probability response image may be determined as follows. FIG. 3 is a diagram of a cascade of classifiers for object detection according to an embodiment of the present invention. As shown in FIG. 3, the cascade structure comprises a series of stage classifiers 302, 304, . . . 306. In an embodiment, the cascade structure may be arranged as shown in "Rapid Object Detection Using a Boosted Cascade of Simple Features," by Paul Viola and Michael Jones, Conference on Computer Vision and Pattern Recognition (CVPR), 2001. A cascade classifier is a set of concatenated stage classifiers where unlike examples would be rejected at early stages. When a detection window 300 goes through the cascade structure of classifiers, the more stages it passes, the more likely it is a positive example.

In an embodiment, an individual cascade classifier may be trained for each potential facial landmark. In one embodiment, the Machine Perception Laboratory (MPLab) at the University of California at San Diego (UCSD) GENKI face database may be used as a training data set. The MPLab GENKI Database is an expanding database of images containing faces spanning a wide range of illumination conditions, geographical locations, personal identity, and ethnicity. The GENKI Database may be found on the Internet at http://mplab-ucsd-edu/wordpress/?page_id=398 (where each "." has been replaced with a "-" to deter web access from this document). The face images may be normalized to 96×96 pixels, and then cropped with a patch of 16×16 pixels around facial landmark points as training examples. Since the left/right corners of mouth/eye appear symmetrical, in an embodiment, only two classifiers may need to be trained. One classifier is for the left corner of eye, the other classifier is for the left corner of mouth. The image patch may be flipped horizontally to detect right corners.

Figure 4:
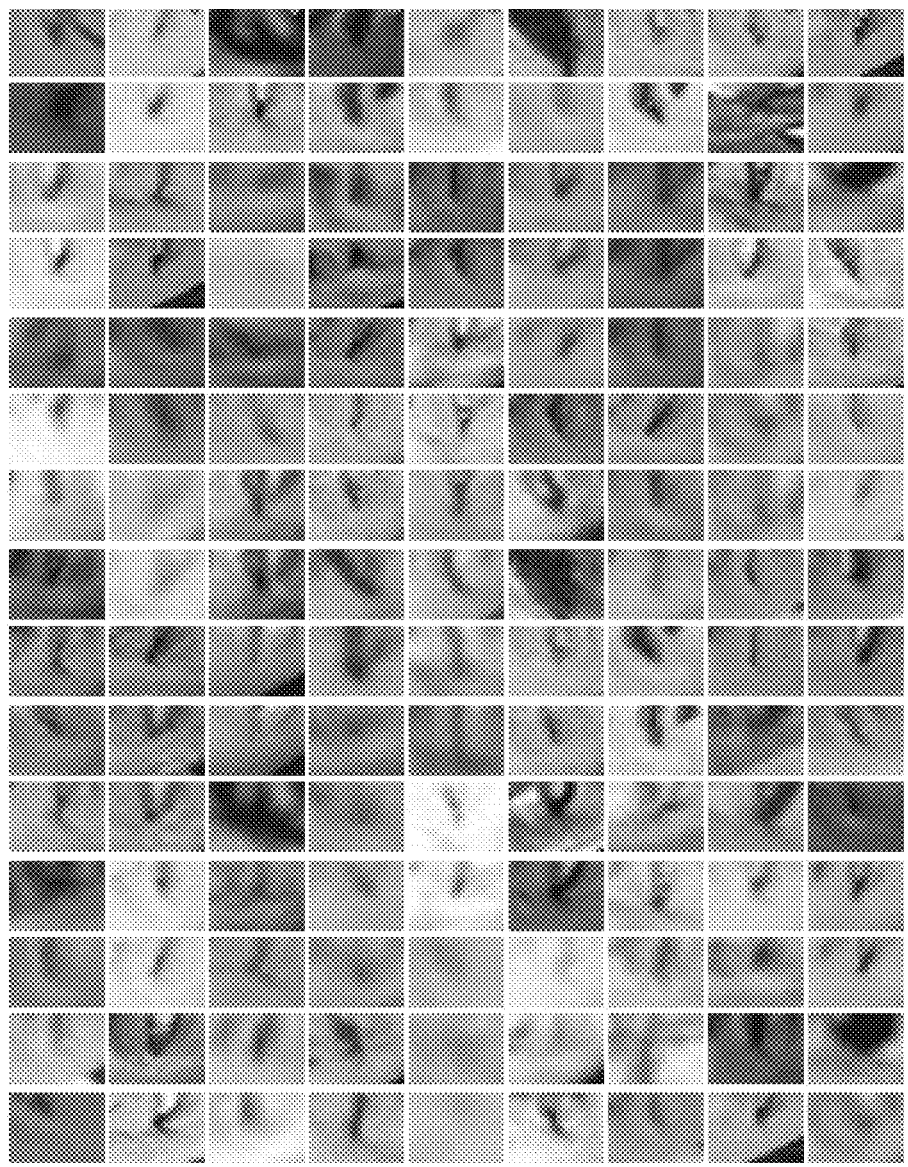
FIG. 4 is a set of example training images for a mouth corner classifier according to an embodiment of the present invention.

FIG. 4 is a set of example training images for a mouth corner classifier according to an embodiment of the present invention. The mouth corner classifier may be used to analyze each face image patch in turn to train the classifier.

Figure 5A:
FIGS. 5A-5C are an example of a sample image, a response image, and a smoothed result according to an embodiment of the present invention.
Figure 5B:
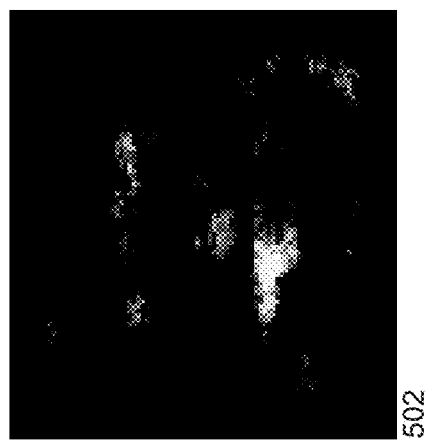
Figure 5C:

FIGS. 5A-5C show an example of a response image and a smoothed result according to an embodiment of the present invention. In the example, when a cascade classifier for the left corner of the mouth is applied to the sample face image 500 in FIG. 5A, the result is the probability response image 502 in FIG. 5B. In an embodiment, a Gaussian smoothing process may be applied to the probability response image 502, resulting in smoothed image 504 in FIG. 5C. It can be seen that the region around the left corner of the mouth gets much higher response than other regions.

Since the probabilistic response is typically not reliable enough, in an embodiment the geometry relationship among different facial landmark points may be analyzed. In an embodiment, this can be done by building a parametric shape model and using the ASM search framework.

In ASM search, the cost of each landmark point may be represented as:

$$E_i = 1 - P(x, y) \quad (1)$$

where $P(x, y)$ is the probabilistic score of the landmark at the location $(x, y)$.

The ASM cost function may be defined as:

$$\min_S \sum_i E_i^{\min s \Sigma_i E_i} + \text{regulation term} \quad (2)$$

where S is the shape control parameters that will be introduced below, and the regulation term considers the geometry constraints between landmark points.

By minimizing the ASM cost function, the ASM search will find the optimal position of one or more landmark points in the face images.

Figure 6:
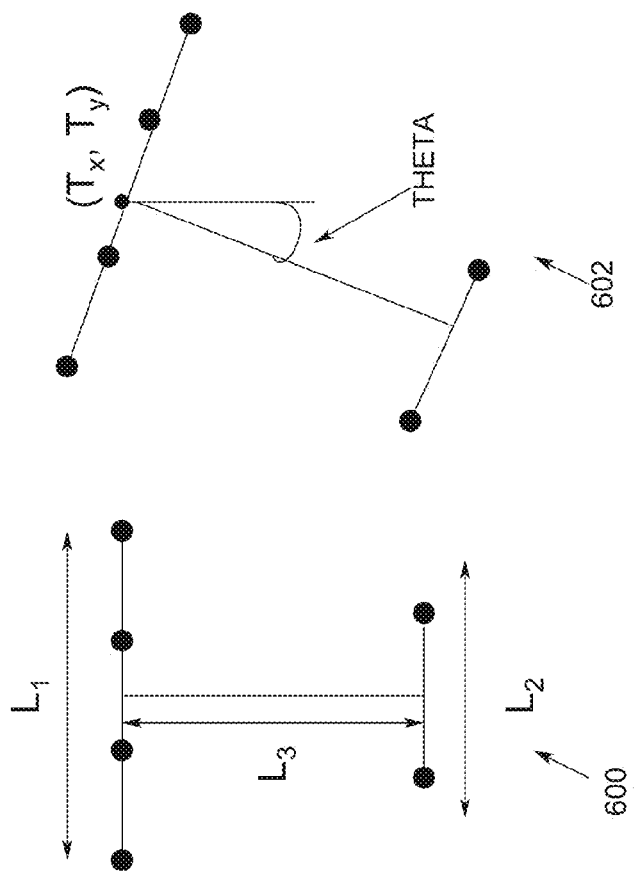
FIG. 6 is the geometry relationship between landmark points according to an embodiment of the present invention.
Figure 7B:
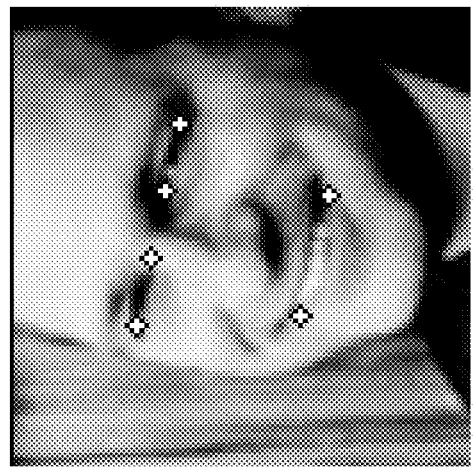
FIGS. 7A-7D are examples of sets of detected landmark points in facial images according to an embodiment of the present invention.
Figure 7A:
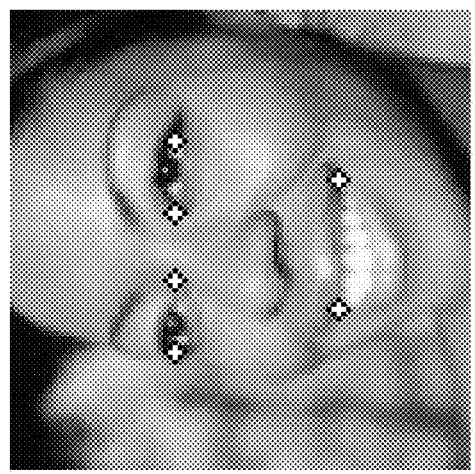
Figure 7C:
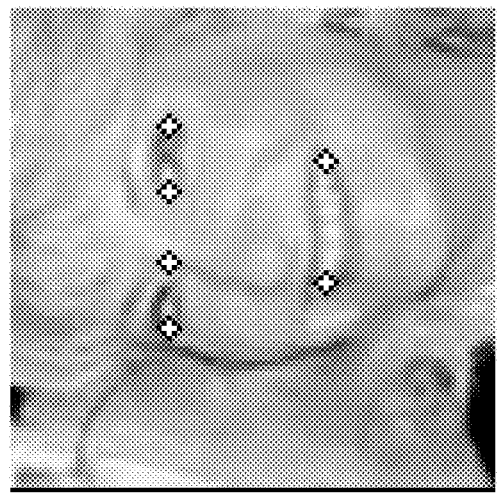
Figure 7D:
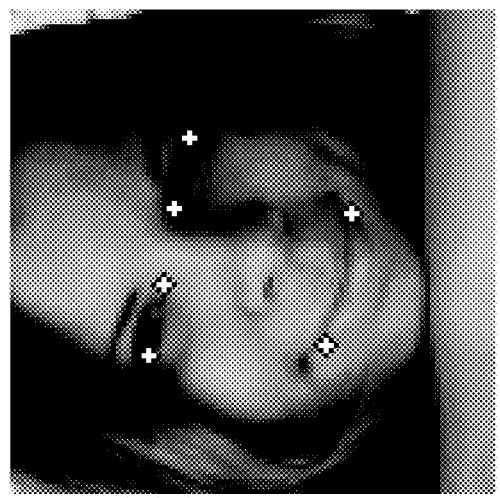

In an embodiment, the geometry constraint and cost function may be determined as follows. Six landmark points on a face may be detected, i.e., the inner/outer corners of both eyes, and the left/right corners of mouth. To make a simple geometry relationship, suppose four points of the eye corners form a straight line which appears parallel to the mouth corner line. In addition, assume the face landmark points are always horizontally symmetrical. In this way, these six landmark points (shown as solid circles) can be described by three parameters ($L_1$, $L_2$, $L_3$) as shown in FIG. 6 as a base shape formed by six landmark points 600. The $L_1$ measures the distance between outer corners of two eyes, $L_2$ measures the width of the mouth, and $L_3$ measures the mouth-to-eyes distance (i.e., a line perpendicular to the lines between the eye corners and the mouth corners). For shape searching in the face image, three additional parameters ($t_x$, $t_y$, $\theta$) may be introduced to describe the translation and rotation of the base shape as shown as 602 in FIG. 6. Therefore, in an embodiment, six parameters may be used $S = (L_1, L_2, L_3, t_x, t_y, \theta)$ to model the location of landmark points in an ASM-like search. Note that in the original ASM concept, the shape variation modes are derived from statistical analysis on shape examples, while in an embodiment of the present invention, the three variation modes ($L_1$, $L_2$, $L_3$) may be artificially defined based on a priori knowledge.

FIGS. 7A-7D are examples of sets of detected landmark points in facial images according to an embodiment of the present invention. FIGS. 7A-7D show the description ability of the base shape while fitting to example images in the GENKI database. It can be seen that the shape parameter $S = (L_1, L_2, L_3, t_x, t_y, \theta)$ manages to cover a broad range of face shape variations.

FIG. 8 is a diagram of impractical face shapes according to an embodiment of the present invention. If $L_1$, $L_2$, $L_3$ take arbitrary values, impractical face shapes may be generated as in 800 and 802. Therefore, constraints may need to be introduced between variation modes $L_1$, $L_2$, and $L_3$.

Figure 9:
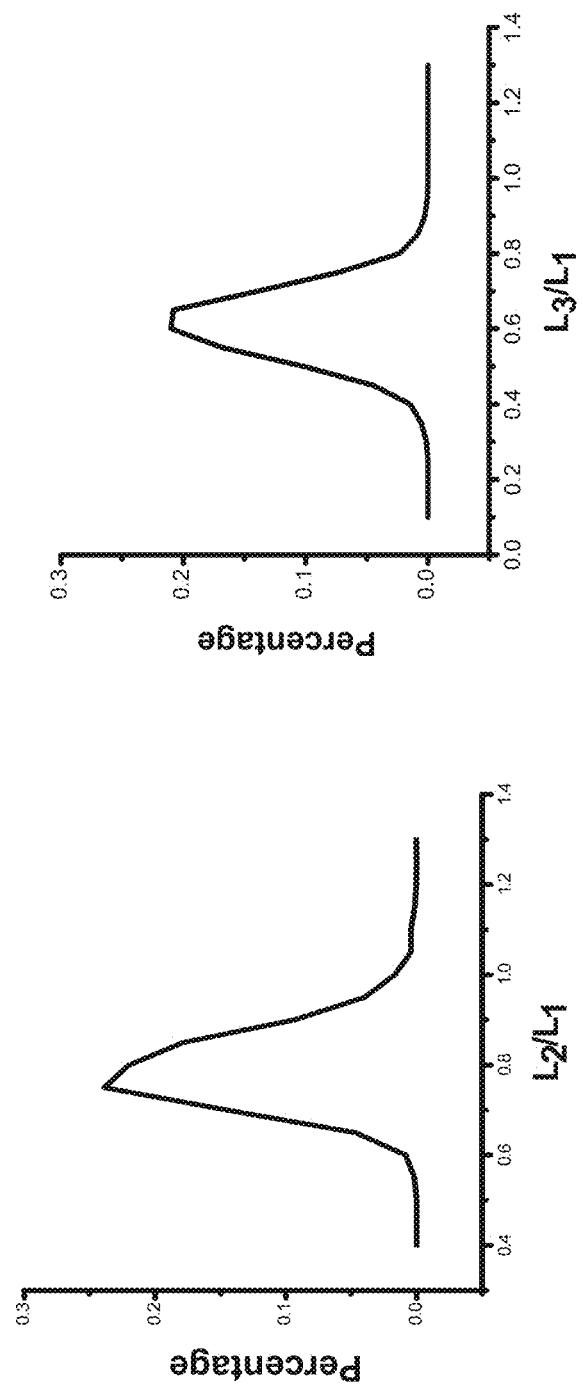
FIG. 9 is a set of charts showing distributions of ratios of facial features according to an embodiment of the present invention.

In ASM/AAM statistical models, to prevent generating invalid examples, the coefficients of variation modes may be limited within $[-3\sqrt{\lambda_i}, +3\sqrt{\lambda_i}]$, ($\lambda_i$ is the eigenvalue of eigenvector in sample statistics). In an embodiment, a simplified strategy may be used in constructing the cost function. First, statistics on the ratio between $L_1$ and $L_2$, also $L_1$ and $L_3$ may be determined in the empirical data. FIG. 9 is a set of charts showing distributions of ratios of facial features in the GENKI database according to an embodiment of the present invention.

Assuming $L_2/L_1$ and $L_3/L_1$ are independent of each other and they are both Gaussian distributions, the geometry constraints are added into cost function as regulation terms:

$$\min_S \left( \sum E_i + K_1 \left\| \frac{L_2/L_1 - u_1}{3\delta_1} \right\| + K_2 \left\| \frac{L_3/L_1 - u_2}{3\delta_2} \right\| \right)$$

where $u_i$ and $\delta_i$ ($i=1, 2$) are the mean and variance of the ratio, and the parameter $K_i$ ($i=1, 2$) are weights determining the relative importance of valid shape and high possibility of classifier responses.

In an embodiment, a Gauss-Newton iteration may be used to minimize the cost function of the ASM search. Given an initial estimation of the shape parameters, the Gauss-Newton method executes efficiently and it will generally converge within 10 steps based on experiments of the applicants. However, due to many local minimal cost scores in ASM search, the initial estimation largely affects the quality of the final position of facial landmark points. To deal with this problem, multiple groups of initial value may be provided to the shape parameters (block 208 of FIG. 2) and the ASM search may be run multiple times (blocks 210, 212, . . . 214 of FIG. 2). In an embodiment, the search result with the minimal value of the cost function is selected (block 216 of FIG. 2) as the final output.

Figure 10:
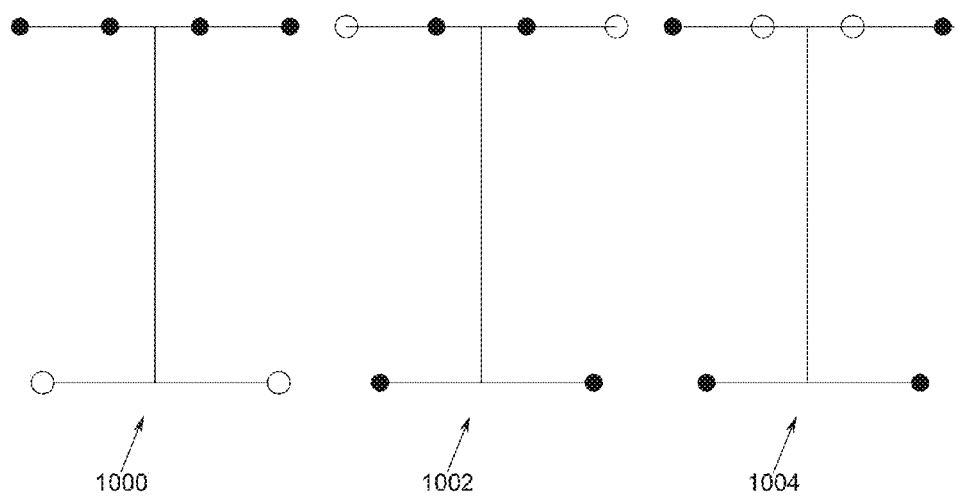
FIG. 10 is a diagram of three example ASM initializations to shape parameters according to an embodiment of the present invention.

FIG. 10 is a diagram of three example ASM initializations for shape parameters according to an embodiment of the present invention. For each landmark point, the corresponding cascade classifier will suggest a "best" location with a maximum probability in the face images. In an embodiment, four points among them may be picked to estimate the best fit shape parameter for the initialization of ASM search. Since there are several combinations of picking four points from the six available points, the different combinations of points may provide different initializations for the multiple ASM searches. In FIG. 10, in each example 1000, 1002, and 1004, the four solid dots are used to estimate the initial shape parameters, while the other two empty dots are not used.

Some experimental results are described as follows. Given a ground-truth of six landmark points, a relative error measurement $r_e$ is defined to evaluate the accuracy of the detection algorithm:

$$r_e = \frac{\max e_i}{L_1}$$

where $e_i$ is the point-to-point error for each individual landmark location, and L1 is the distance of two outer corners of eyes in ground-truth.

FIG. 11 is a diagram of an error distribution of facial landmark detection results according to an embodiment of the present invention. FIG. 11 shows the cumulative error distribution of embodiments of the present invention operated on the publicly available FaceTracer dataset. This dataset is a large collection of real-world face images, collected from the Internet. It covers a wide range of variations in age and race, expression, and lighting. The cumulative error distribution illustrates how many detected images with error is less $r_e$. From FIG. 11, it can be seen that embodiments of the present invention process 95% of face images with $r_e$<0.15. To make the matter intuitive, FIG. 11 also shows a sample image having a landmark detection result with $r_e$=0.15, where the distance between two outer corners of eye is 42 pixels, and the maximal deviation of landmark points is 6 pixels. This shows that $r_e$=0.15 is generally acceptable in most of face alignment situations.

After face region extraction, the face area may be normalized to a 96×96 image patch for landmark point detection. This ensures that detection time is independent of face image size. In an embodiment, the majority of execution time is spent on calculating the landmark response image by running the cascade classifiers, followed by Gauss-Newton based ASM iteration. Table 1 shows an example of the average time breakdown of the hot modules operating on the GENKI database, executing on a sample desktop computer and Atom-based netbook, respectively.

TABLE 1

| Main modules | Integral image | Running cascade | ASM iterations |
|---|---|---|---|
| Core2Duo 2.4 GHz | 0.052 ms | 3.023 ms | 0.240 ms |
| Atom 1.6 GHz | 0.201 ms | 16.608 ms | 1.190 ms |

Table 2 compares the executing speed of an embodiment of the present invention and a known process as disclosed in "Robust Face Alignment Based on Hierarchical Classifier Network," by Li Zhang, Haizhou Ai, and Shihong Lao, Proceedings of the Human Computer Interface (HCI)/ European Conference on Computer Vision (ECCV) Workshop, Lecture Notes in Computer Science (LNCS) 3979, pp. 1-11, 2006. When applied to video, a tracking mode for facial landmark points may be introduced in an embodiment by utilizing the consistency of video frames. It means the search result in a previous frame is taken as the ASM initialization in a current frame. This strategy speeds up the facial landmark detection in video with little loss in accuracy. As the Zhang, et al., process does not have a tracking mode, only its detection is shown in Table 2. From the comparison, an embodiment of the present invention is least five times faster than an implantation of the Zhang, et al., process. The efficient landmark detector of embodiments of the present invention enables improved real-time performance on an Atom processor commercially available from Intel Corporation (for example), which can be broadly used in embedded platforms with limited computing and power resources.

TABLE 2

| Platform | Core2Duo 2.4 GHz | Atom 1.6 GHz |
|---|---|---|
| Detection mode in an embodiment of the present invention | 5.1 ms/face | 21.0 ms/face |
| Tracking mode in an embodiment of the present invention | 4.5 ms/face | 18.2 ms/face |
| Detection mode in Zhang, et al. | 25.3 ms/face | 107.0 ms/face |

Figure 13:
Figure 14:
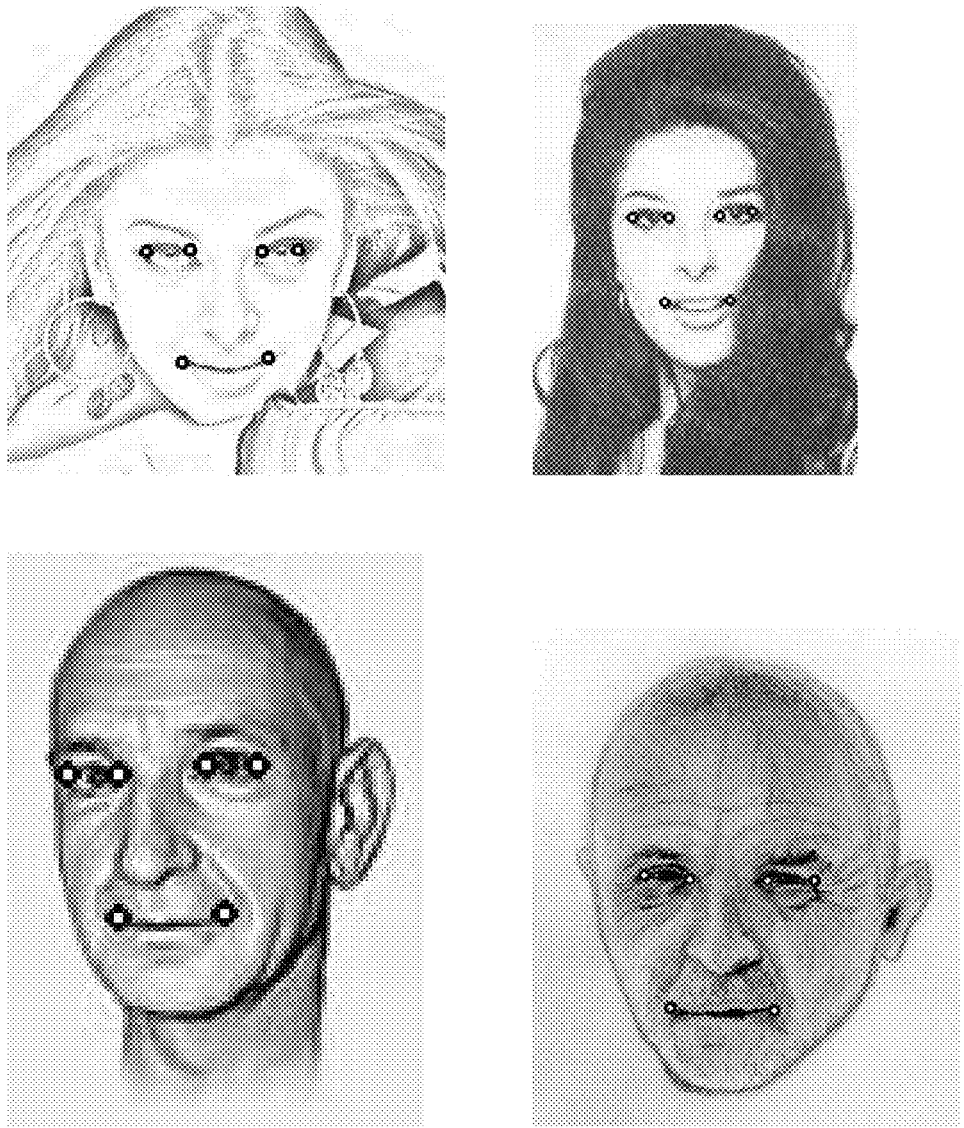

To further investigate the robustness of embodiments of the present invention, the present approach was tested on faces with various expressions, poses, moustaches, sunglasses, and also on line drawn faces. FIGS. 12-14 is an example set of detection results of facial landmarks according to an embodiment of the present invention. It can be seen that embodiments of the present invention are quite robust in various situations and even in extreme cases.

Embodiments of the present invention provide a fast and accurate facial landmark detector using Haar cascade classifiers and geometry constraints. Due to the increased efficiency, such facial landmark detection may be effectively performed on an embedded computing platform with limited computational resources. On an example Atom processor-based system, embodiments of the present invention can process up to 50 faces per second, which provides excellent real-time performance and leads to low power consumption. The accuracy may also be comparable with other known state-of-the-art processes. Based on the advantages of accurate and very low computational resources being required, the landmark detector of embodiments of the present invention may be widely used in many face analysis applications in computing platforms.

Figure 15:
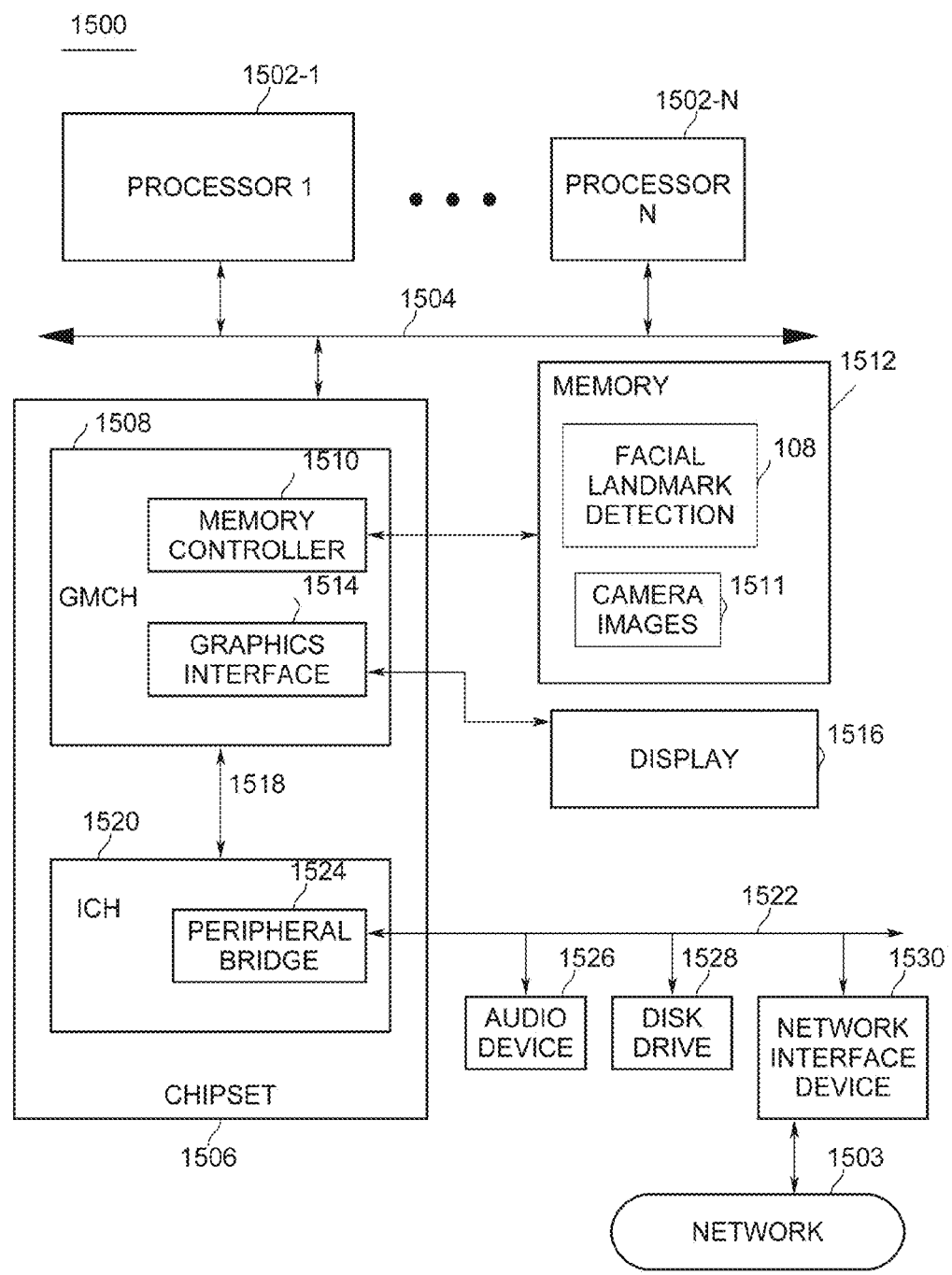
FIGS. 15 and 16 illustrate block diagrams of embodiments of processing systems, which may be utilized to implement some embodiments discussed herein.

FIG. 15 illustrates a block diagram of an embodiment of a processing system 1500. In various embodiments, one or more of the components of the system 1500 may be provided in various electronic computing devices capable of performing one or more of the operations discussed herein with reference to some embodiments of the invention. For example, one or more of the components of the processing system 1500 may be used to perform the operations discussed with reference to FIGS. 1-14, e.g., by processing instructions, executing subroutines, etc. in accordance with the operations discussed herein. Also, various storage devices discussed herein (e.g., with reference to FIG. 15 and/or FIG. 16) may be used to store data, operation results, etc. In one embodiment, data received over the network 1503 (e.g., via network interface devices 1530 and/or 1630) may be stored in caches (e.g., L1 caches in an embodiment) present in processors 1502 (and/or 1602 of FIG. 16). These processors may then apply the operations discussed herein in accordance with various embodiments of the invention.

More particularly, processing system 1500 may include one or more processing unit(s) 1502 or processors that communicate via an interconnection network 1504. Hence, various operations discussed herein may be performed by a processor in some embodiments. Moreover, the processors 1502 may include a general purpose processor, a network processor (that processes data communicated over a computer network 1503, or other types of a processor (including a reduced instruction set computer (RISC) processor or a complex instruction set computer (CISC)). Moreover, the processors 1502 may have a single or multiple core design. The processors 1502 with a multiple core design may integrate different types of processor cores on the same integrated circuit (IC) die. Also, the processors 1502 with a multiple core design may be implemented as symmetrical or asymmetrical multiprocessors. Moreover, the operations discussed with reference to FIGS. 1-14 may be performed by one or more components of the system 1500. In an embodiment, a processor (such as processor 1 1502-1) may comprise facial landmark detection component 108, facial analysis component 106, and/or application 102 as hardwired logic (e.g., circuitry) or microcode. In an embodiment, multiple components shown in FIG. 15 may be included on a single integrated circuit (e.g., system on a chip (SOC).

A chipset 1506 may also communicate with the interconnection network 1504. The chipset 1506 may include a graphics and memory control hub (GMCH) 1508. The GMCH 1508 may include a memory controller 1510 that communicates with a memory 1512. The memory 1512 may store data, such as images 1511 from camera 104. The data may include sequences of instructions that are executed by the processor 1502 or any other device included in the computing system 1500. Furthermore, memory 1512 may store one or more of the programs such as facial landmark detection component 108, instructions corresponding to executables, mappings, etc. The same or at least a portion of this data (including instructions, camera images, face models, and temporary storage arrays) may be stored in disk drive 1528 and/or one or more caches within processors 1502. In one embodiment of the invention, the memory 1512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1504, such as multiple processors and/or multiple system memories.

The GMCH 1508 may also include a graphics interface 1514 that communicates with a display 1516. In one embodiment of the invention, the graphics interface 1514 may communicate with the display 1516 via an accelerated graphics port (AGP). In an embodiment of the invention, the display 1516 may be a flat panel display that communicates with the graphics interface 1514 through, for example, a signal converter that translates a digital representation of an image stored in a storage device such as video memory or system memory into display signals that are interpreted and displayed by the display 1516. The display signals produced by the interface 1514 may pass through various control devices before being interpreted by and subsequently displayed on the display 1516. In an embodiment, camera images, face models, and facial landmarks processed by facial landmark detection component 108 may be shown on the display to a user.

A hub interface 1518 may allow the GMCH 1508 and an input/output (I/O) control hub (ICH) 1520 to communicate. The ICH 1520 may provide an interface to I/O devices that communicate with the computing system 1500. The ICH 1520 may communicate with a link 1522 through a peripheral bridge (or controller) 1524, such as a peripheral component interconnect (PCI) bridge, a universal serial bus (USB) controller, or other types of peripheral bridges or controllers. The bridge 1524 may provide a data path between the processor 1502 and peripheral devices. Other types of topologies may be utilized. Also, multiple links may communicate with the ICH 1520, e.g., through multiple bridges or controllers. Moreover, other peripherals in communication with the ICH 1520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), camera 104, or other devices.

The link 1522 may communicate with an audio device 1526, one or more disk drivels) 1528, and a network interface device 1530, which may be in communication with the computer network 1503 (such as the Internet, for example). In an embodiment, the device 1530 may be a network interface controller (NIC) capable of wired or wireless communication. Other devices may communicate via the link 1522. Also, various components (such as the network interface device 1530) may communicate with the GMCH 1508 in some embodiments of the invention. In addition, the processor 1502, the GMCH 1508, and/or the graphics interface 1514 may be combined to form a single chip. In an embodiment, images 1511, and/or facial landmark detection component 108 may be received from computer network 1503. In an embodiment, the facial analysis component 106 and/or the facial landmark detection component 108 may be a plug-in for a web browser executed by processor 1502.

Furthermore, the computing system 1500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 1500 may be arranged in a point-to-point (PtP) configuration such as discussed with reference to FIG. 16. For example, processors, memory, and/or input/output devices may be interconnected by a number of point-to-point interfaces.

Figure 16:
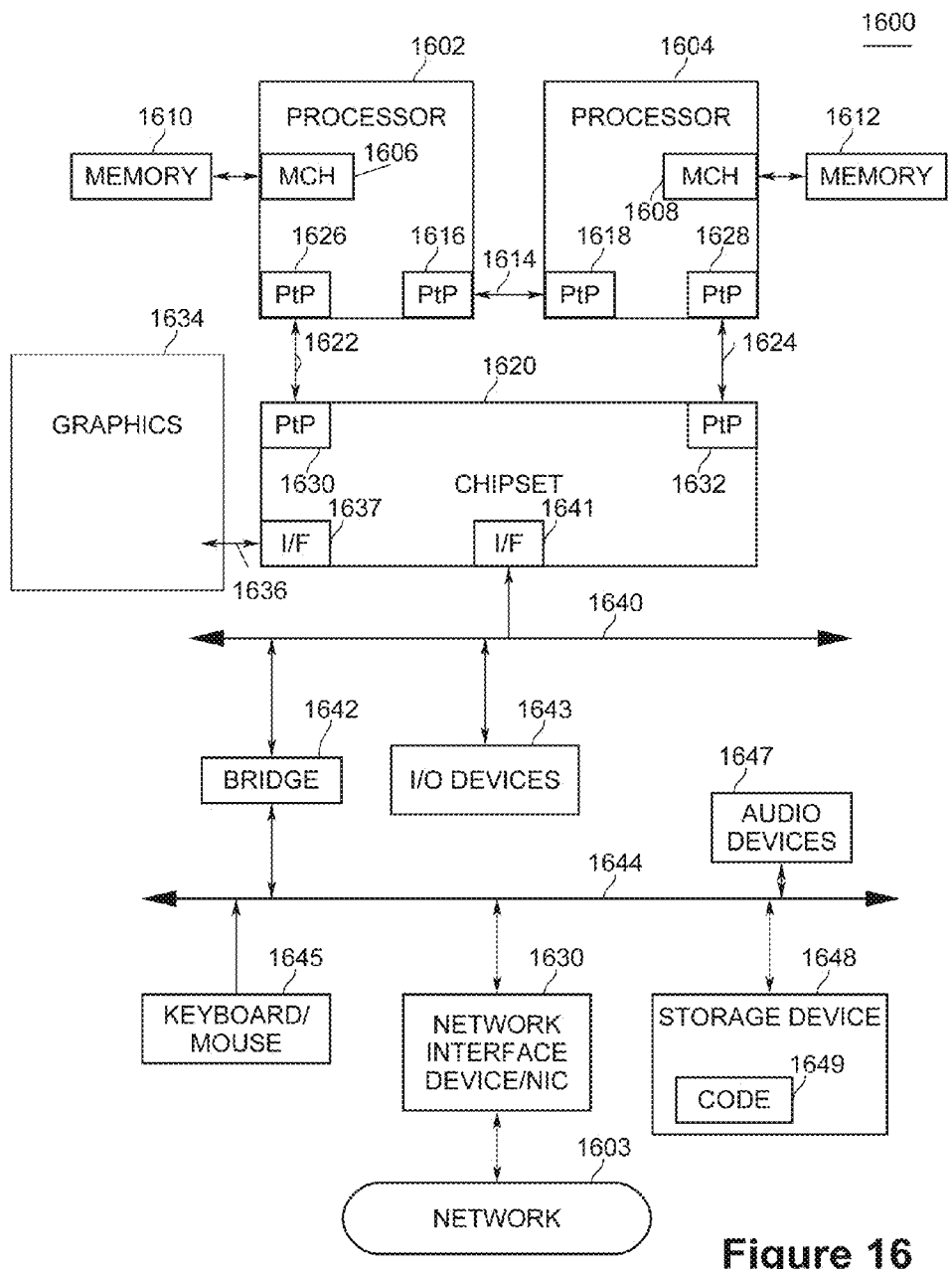

More specifically, FIG. 16 illustrates a computing system 1600 that is arranged in a point-to-point (PtP) configuration, according to an embodiment of the invention. In particular, FIG. 16 shows a system where processors, memory, and input/output devices are interconnected by a number of point-to-point interfaces. The operations discussed with reference to FIGS. 1-14 may be performed by one or more components of the system 1600.

As illustrated in FIG. 16, the system 1600 may include multiple processors, of which only two, processors 1602 and 1604 are shown for clarity. The processors 1602 and 1604 may each include a local memory controller hub (MCH) 1606 and 1608 (which may be the same or similar to the GMCH 1508 of FIG. 15 in some embodiments) to couple with memories 1610 and 1612. The memories 1610 and/or 1612 may store various data such as those discussed with reference to the memory 1512 of FIG. 15.

The processors 1602 and 1604 may be any suitable processor such as those discussed with reference to processors 1502 of FIG. 15. The processors 1602 and 1604 may exchange data via a point-to-point (PtP) interface 1614 using PtP interface circuits 1616 and 1618, respectively. The processors 1602 and 1604 may each exchange data with a chipset 1620 via individual PtP interfaces 1622 and 1624 using point to point interface circuits 1626, 1628, 1630, and 1632. The chipset 1620 may also exchange data with a high-performance graphics circuit 1634 via a high-performance graphics interface 1636, using a PtP interface circuit 1637.

At least one embodiment of the invention may be provided by utilizing the processors 1602 and 1604. For example, the processors 1602 and/or 1604 may perform one or more of the operations of FIGS. 1-14. Other embodiments of the invention, however, may exist in other circuits, logic units, or devices within the system 1600 of FIG. 16. Furthermore, other embodiments of the invention may be distributed throughout several circuits, logic units, or devices illustrated in FIG. 16.

The chipset 1620 may be coupled to a link 1640 using a PtP interface circuit 1641. The link 1640 may have one or more devices coupled to it, such as bridge 1642 and I/O devices 1643. Via link 1644, the bridge 1643 may be coupled to other devices such as a keyboard/mouse 1645, the network interface device 1630 discussed with reference to FIG. 15 (such as modems, network interface cards (NICs), or the like that may be coupled to the computer network 1503), audio I/O device 1647, and/or a data storage device 1648. The data storage device 1648 may store, in an embodiment, facial landmark detection component code 1649 that may be executed by the processors 1602 and/or 1604.

In various embodiments of the invention, the operations discussed herein, e.g., with reference to FIGS. 1-16, may be implemented as hardware (e.g., logic circuitry), software (including, for example, micro-code that controls the operations of a processor such as the processors discussed with reference to FIGS. 15 and 16), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method of detecting facial landmarks in a face detected in an image comprising:
   cropping a face rectangle region of the detected face in the image and generating an integral image based at least in part on the face rectangle region;
   executing a Haar cascade classifier for each facial landmark of the face rectangle region to produce a response image for each facial landmark based at least in part on the integral image;
   setting up a plurality of Active Shape Model (ASM) initializations;
   performing ASM searching for each of the ASM initializations based at least in part on the response images, each ASM search resulting in a search result having a cost based on a cost E of at least one landmark point i, wherein the cost E at a landmark point i may be represented as $$E_i = 1 - P(x,y)$$

where $P(x, y)$ is a probabilistic score of the landmark point at a location $(x, y)$; and
   selecting a search result of the ASM searches having a lowest cost function, the selected search result indicating locations of the facial landmarks in the image.

2. The method of claim 1, wherein the facial landmarks consist of inner and outer corners of eyes and left and right corners of a mouth of a face.

3. The method of claim 2, wherein the search result consists of six pairs of coordinates representing locations in the image where the facial landmarks are located.

4. The method of claim 1, wherein the ASM initializations are based at least in part on a probabilistic response from a cascade classifier.

5. The method of claim 1, wherein classifiers are arranged in a cascade in order of complexity, where each successive classifier is trained only on those selected samples which pass through the preceding classifiers.

6. The method of claim 1, wherein ASM searching comprises analyzing a geometry relationship among different facial landmark points.

7. A processing system to perform image analysis processing, comprising:
   a face detection component to analyze an image to detect a face in the image; and
   a facial landmark detection component to analyze the face image to detect facial landmarks, the facial landmark detection component adapted to crop a face rectangle region of the detected face in the image and generate an integral image based at least in part on the face rectangle region, to execute a Haar cascade classifier for each facial landmark of the face rectangle region to produce a response image for each facial landmark based at least in part on the integral image, to set up a plurality of Active Shape Model (ASM) initializations, to perform ASM searching for each of the ASM initializations based at least in part on the response images, each ASM search resulting in a search result having a cost based on a cost E of at least one landmark point i, wherein the cost E at a landmark point i may be represented as $$E_i = 1 - P(x,y)$$

where P(x, y) is a probabilistic score of the landmark point at a location (x, y), and to select a search result of the ASM searches having a lowest cost function, the selected search result indicating locations of the facial landmarks in the image.

8. The processing system of claim 7, wherein the facial landmarks consist of inner and outer corner of eyes and left and right corners of a mouth and of a face.

9. The processing system of claim 8, wherein the search result consists of six pairs of coordinates representing locations in the image where the facial landmarks are located.

10. The processing system of claim 7, wherein the facial landmark detection component is further adapted to perform ASM initializations based at least in part on a probabilistic response from a cascade classifier.

11. The processing system of claim 7, wherein classifiers are arranged in a cascade in order of complexity, where each successive classifier is trained only on those selected samples which pass through the preceding classifiers.

12. The processing system of claim 7, wherein the facial landmark detection component is further adapted to perform ASM searching by analyzing a geometry relationship among different facial landmark points.

13. A processing system to perform image analysis processing, comprising:
a camera to capture an image;
a face detection component to analyze the image to detect a face in the image;
a facial landmark detection component to analyze the face image to detect facial landmarks, the facial landmark detection component adapted to crop a face rectangle region of the detected face in the image and generate an integral image based at least in part on the face rectangle region, to execute a Haar cascade classifier for each facial landmark of the face rectangle region, to produce a response image for each facial landmark based at least in part on the integral image, to set up a plurality of Active Shape Model (ASM) initializations, to perform ASM searching for each of the ASM initializations based at least in part on the response images, each ASM search resulting in a search result having a cost based on a cost E of at least one landmark point i, wherein the cost E at a landmark point i may be represented as $$E_i = 1 - P(x,y)$$

where P(x, y) is a probabilistic score of the landmark point at a location (x, y), and to select a search result of the ASM searches having a lowest cost function, the selected search result indicating locations of the facial landmarks in the image; and
a display to show the image, wherein the display is a flat panel display.

14. The processing system of claim 13, wherein the facial landmarks consist of inner and outer corners of eyes and left and right corners of a mouth of a face.

15. The processing system of claim 14, wherein the search result consists of six pairs of coordinates representing locations in the image where the facial landmarks are located.

16. The processing system of claim 13, wherein the facial landmark detection component is further adapted to perform ASM initializations based at least in part on a probabilistic response from a cascade classifier.

17. The processing system of claim 13, wherein classifiers are arranged in a cascade in order of complexity, where each successive classifier is trained only on those selected samples which pass through the preceding classifiers.

18. The processing system of claim 13, wherein the facial landmark detection component is further adapted to perform ASM searching by analyzing geometry relationship among different facial landmark points.

19. A non-transitory machine-readable storage medium comprising instructions arranged, when executed, to implement a method or realize an apparatus as claimed in any preceding claim.

* * * * *